United States Patent [19]

Hechler et al.

[11] Patent Number: 5,618,585

[45] Date of Patent: Apr. 8, 1997

[54] PROCESS FOR THE PRODUCTION OF A COATED SYSTEM

[75] Inventors: Wolfgang Hechler, Lautertal; Johann Dietz, Bickenbach; Manfred Weigand, Weiterstadt; Karl Osterried, Dieburg, all of Germany

[73] Assignee: Merck Patent Gesellschaft mit Beschrankter Haftung, Darmstadt, Germany

[21] Appl. No.: 616,376

[22] Filed: Mar. 15, 1996

Related U.S. Application Data

[62] Division of Ser. No. 838,162, Feb. 20, 1992, abandoned.

[30] Foreign Application Priority Data

Feb. 20, 1991 [DE] Germany .................. 41 05 235.8

[51] Int. Cl.$^6$ ...................................... B05D 3/02
[52] U.S. Cl. ............... 427/376.1; 427/162; 427/376.2; 427/376.4; 427/380; 427/419.2
[58] Field of Search ............. 427/376.1, 376.2, 427/376.4, 380, 419.2, 162

[56] References Cited

U.S. PATENT DOCUMENTS

| | | | |
|---|---|---|---|
| 2,681,865 | 6/1954 | Heine | 427/292 |
| 3,510,343 | 5/1970 | Turner | 428/427 |
| 3,955,038 | 5/1976 | Lindstrom | 428/457 |
| 4,187,336 | 2/1980 | Gordon | 428/34 |
| 4,272,588 | 6/1992 | Yoldas | 428/433 |
| 4,692,385 | 9/1987 | Johnson | 428/469 |
| 4,769,290 | 9/1988 | Hettich | 428/432 |
| 4,847,157 | 7/1989 | Goodman | 428/426 |
| 5,055,358 | 10/1991 | Livingston | 428/433 |
| 5,077,112 | 12/1991 | Hinsel | 428/76 |
| 5,139,856 | 8/1992 | Takeuchi | 428/216 |

FOREIGN PATENT DOCUMENTS

| | | |
|---|---|---|
| 63-48358 | 3/1988 | Japan . |
| 01192785 | 8/1989 | Japan . |
| 63-18181 | 8/1989 | Japan . |

*Primary Examiner*—Bernard Pianalto
*Attorney, Agent, or Firm*—Millen, White, Zelano, & Branigan, P.C.

[57] ABSTRACT

The invention relates to a coated system which has a chemically and mechanically very stable surface coating of high aesthetic attraction which has a specular and optionally iridescent color and/or a body color on a metal, ceramic or quartz glass substrate provided with an enamel or glaze coating, the surface coating being obtainable

- by single or repeated application of aqueous metal oxide sols,
- by subsequently drying and optionally igniting the metal oxide sol coating at each application step,
- the metal oxide sols having a mean particle size of between 5 and 200 nm,
- ignition being carried out at least once after completion of the final application step and at temperatures higher than 700° C. and below the softening point of the substrate,
- the metal oxide coating on the glaze or enamel coating having, after ignition, a refractive index at least 0.5 higher than the refractive index of the enamel or glaze coating, and
- the total thickness of the ignited metal oxide coatings being less than 500 nm.

13 Claims, No Drawings

PROCESS FOR THE PRODUCTION OF A COATED SYSTEM

This is a division of the application Ser. No. 07/838,162, filed Feb. 20, 1992 abandoned.

The invention relates to a coated system which has a surface coating which is very stable chemically and mechanically and has a specular and optionally iridescent color and/or a body color on a glaze or enamel substrate and has been produced by applying and subsequently drying and firing an aqueous metal oxide sol.

JP 192785/1989 describes earthenware having an iridescent surface coating which is obtained by applying a coating of colloidal silicon oxide to the glaze coating of the earthenware and subsequently firing at high temperatures of between 800° and 900° C. However, the $SiO_2$ coating has a relatively large thickness of up to 10 μm, which is disadvantageous since thick coatings produce relatively porous surfaces on firing and tend to form cracks. In addition, the relatively large coating thickness considerably impairs the brilliance of the interference colors produced, which is particularly disadvantageous since the light intensity reflected at the $SiO_2$ coating/glaze coating phase interface is relatively low anyway due to the relatively similar refractive indices of these coatings.

JP 63/48358 proposes a complicated process for producing relatively thick and substantially crack-free zirconium dioxide coatings on a metal or quartz glass substrate. To this end, a zirconium dioxide sol coating is first applied and warmed to a temperature between 30° and 70° C. at a relative atmospheric humidity of 70–95%; the coating is subsequently heated to temperatures of 100°–500° C. at a low heating rate of 0.2–5 K/min at a relative atmospheric humidity of 10–40%. However, the relatively low maximum heating temperature of less than 500° C. produces a surface coating which is less stable chemically and mechanically. Due to the relatively large coating thicknesses of up to 8 μm and the surface which is only smooth and free from cracks to a limited extent, in spite of the complicated production process, these systems are 10 not suitable for producing a specular gloss and/or a brilliant color play of high aesthetic attraction and consequently the optical properties of the surface coatings obtained are not described in JP 63/48358.

SUMMARY OF THE INVENTION

There was thus a demand for coated systems having a surface coating which has a specular and optionally iridescent color and/or a body color on a glaze or enamel substrate and can be obtained by applying and subsequently heating a metal oxide sol coating, the surface coatings being characterized by low porosity, high mechanical and chemical stability and in particular by high specular gloss and, in some cases, by a brilliant color play of high aesthetic attraction which is based on an interference and/or absorption color.

The present invention provides coated systems having surfaces of this type which do not have the disadvantages occurring in the case of conventional surfaces or only do so to a lesser extent.

The invention thus relates to a coated system which has a chemically and mechanically very stable surface coating of high aesthetic attraction which has a specular and optionally iridescent color and/or a body color on a substrate provided with an enamel or glaze coating, the surface coating being obtainable by single or repeated application of aqueous metal oxide sols, by subsequently drying and optionally igniting the metal oxide sol coating at each application step, the metal oxide sols having a mean particle size of between 5 and 200 nm, ignition being carried out at least once after completion of the final application step and at temperatures higher than 700° C. and below the softening point of the substrate, the metal oxide coating on the glaze or enamel coating having, after ignition, a refractive index at least 0.5 higher than the refractive index of the enamel or glaze coating, and the total thickness of the ignited metal oxide coatings being less than 500 nm.

The systems according to the invention are based on metal, ceramic or quartz glass substrates provided with an enamel or glaze coating. The term "enamel coating" is to be taken in a broad sense and includes single-coat and multi-coat enamel finishes. The glaze coating may likewise be a single-coat or multi-coat glaze, which may have a high or low melting point. However, substrates whose glazes have a softening point above 800° C. are preferred.

The substrates may have a regular or irregular shape and their dimensions may be varied within a broad range. Thus, for example, relatively small substrates, such as, for example, pieces of jewelry, for example charms and the like, or ceramic dental prostheses, and, for example, also ceramic and glazed tiles, cutlery, sanitary ware, signs, sinks, cast-iron stoves or other substrates having essentially larger dimensions can all be provided with a surface according to the invention. This list of suitable substrates is only intended as an illustrative explanation of the invention, not a limitation.

The metal oxide sols are prepared by processes known per se by preparing an aqueous solution of an inorganic or organic metal salt, which is then converted into the sol state, for example by hydrolysis, which can also be effected, for example, by heating, and/or by acidic peptization and/or by adding a base or alternatively by other methods. The preparation of metal oxide sols can, for example, be according to C. J. Brinker, G. W. Scherer, Sol-Gel Science, The Physics and Chemistry of Sol-Gel Processing, Academic Press, San Diego, 1990 and from L. C. Klein, Sol-Gel-Technology for Thin Films, Fibers, Preforms, Electronics and Specialty Shapes, Noyes Publications, Parkridge, N.J., 1988.

In order to modify the pH and/or to stabilize the sol, the anion of the inorganic or organic metal salt is frequently removed, for example using an anion exchanger, an ion exchanger membrane or by electrodialysis, as described, for example, in EP 0 261 560.

The sol particles present in the metal oxide sols used according to the invention have a mean size of between 5 and 200 nm and in particular of between 5 and 100 nm. The sol can be purified by washing, for example in a filtration apparatus, with distilled water or suitable salt solutions, such as, for example, aqueous sodium or potassium salt solutions, which do not cause coagulation of the sol, as proposed in JP 63/48358.

The choice of metal oxides used to prepare the sols is based on the refractive index of the metal oxide coating on the glaze or enamel coating being higher, by at least 0.5, and in particular by at least 0.9, than the refractive index of the enamel or glaze coating. Due to the large jump in the refractive index, a considerable part of the incident light is reflected at this glaze or enamel coating/metal oxide coating interface, whereby brilliant and aesthetically impressive interference colors can be produced. The coating directly adjacent to the enamelled or glazed substrate is preferably prepared using sols of titanium oxide, chromium oxide, tin oxide, zinc oxide, cobalt oxide, iron oxide or zirconium oxide or mixtures of these sols; particular preference is given to sols of titanium dioxide, iron oxide and/or chromium oxide, and very particularly brilliant and aesthetically impressive colors are obtained when titanium oxide and/or iron oxide and in particular titanium oxide, is/are used.

After application, the metal oxide sol coating is dried at temperatures of, for example, 100°–200° C. The application of one or more further metal oxide sol coatings can take place on the dried first coating; however, it is generally preferred to dry each coating at temperatures of 100°–200° C. before applying a further coating and subsequently to ignite each coating at temperatures of above 700° C. In systems having only one coating this is ignited after the drying operation, and in multi-coat systems the system is ignited at least once after the application of the final coating.

The ignition temperature is preferably above 800° C. and very particularly above 900° C., but the ignition temperature should be below the softening point of the substrate. Very aesthetically pleasing substrates having a high specular gloss are frequently obtained if the coated system is kept at the maximum ignition temperature for only a relatively short time, for example, from a few seconds up to about 10 minutes, while the temperature is increased to the maximum ignition temperature relatively slowly, at heating rates of between 5 and 30 K/min. Systems heated by a temperature program of this type also frequently have a particularly smooth surface of very high mechanical stability and scratch resistance. Since the aesthetic impression oft he systems according to the invention is improved by ignition at high temperatures and, in addition, an increase in the mechanical loading capacity is also achieved, substrates having a relatively low softening point are also preferably ignited briefly, i.e., for a few seconds, at temperatures close to the softening point, and sometimes, due to the inertness of the system, it may also be permissible to exceed the softening point very briefly.

The systems according to the invention preferably have no more than 4 metal oxide coatings one on top of the other, but 1-, 2- or 3-coat systems are very particularly preferred. The choice of the metal oxide sols used to produce the second and subsequent coatings is generally less Critical than the choice of metal oxide sol used for the first coating. For the second and subsequent coatings, sols of titanium oxide, cobalt oxide, iron oxide, aluminum oxide or zirconium oxide, or mixtures of these sols are preferably used.

Highly aesthetically attractive systems are obtained if two further metal oxide coatings are applied to the metal oxide coating on the enamel or glaze coating; the first of these two additional coatings, which functions as an intermediate coating, has a refractive index at least 0.5, and preferably 0.9, less than the refractive index of the inner metal oxide coating on the enamel or glaze coating, while the outer metal oxide coating applied after the intermediate coating has a refractive index at least 0.5, and in particular 0.9, higher than the refractive index of the inner metal oxide coating on the enamel or glaze coating. The outer metal oxide coating may, if desired, carry still further metal oxide coatings, including systems in which one or more further pairs of metal oxide coatings of very different refractive indices are applied to the 3 coatings described.

The overall thickness of the ignited metal oxide coatings is less than 500 nm and is preferably between 20 and 400 nm and very particularly between 20 and 200 nm. By varying the coating thickness, various interference colors can be obtained.

If colored metal oxide sols, such as, for example, sols of iron oxide, chromium oxide and/or cobalt oxide, are used, the surface coating obtained also has a body color, which, together with the specular gloss of the surface and any interference color which may be present, gives particularly attractive and impressive effects. It is particularly preferred also to add colored metal salts, such as, for example, nonoxidic inorganic cobalt, nickel and/or chromium salts, to the metal oxide sols, and in particular to colorless metal oxide sols. By using mixed phases of this type, it is possible, for example, to produce single-coat systems having a titanium oxide coating, which, due to its high refractive index, is particularly preferred, this coating simultaneously having a body color determined by the colored salt added. Very generally, the use of these mixed phases very considerably extends the range of color effects which can be achieved.

The amount of the coloring metal salts to be added to the metal oxide sols can be varied to a great extent and one of ordinary skill in the art could clearly determine the operable proportions with respect to the desired effect with only routine experimentation. An example consists in adding $CoCl_2$ to an $Al_2O_3$ resulting in the formation of Thenards blue. The mole ratio of $CoCl_2$ and $Al_2O_3$ can be chosen up to 1:1 but smaller or even much smaller ratios are also possible. In cases of other coloring metal salts and/or other sols even molar ratios of more than 1:1 are possible though usually not preferred.

To produce the systems according to the invention, the surface of the enamelled or glazed substrates is cleaned. The respective metal oxide sol or metal oxide sol mixture or the mixed phase obtained by adding colored nonoxidic inorganic slats to the sol or sol mixture can be applied in various ways. Hereinafter, the sols or sol mixtures or mixed phases are subsumed under the term "sols".

The substrates may, for example, simply be immersed into the particular sol. When the substrate is withdrawn, a thin sol film adheres, the film thickness depending, inter alia, on the sol used, on the rate of withdrawal and on the viscosity, which is affected by the concentration of the sol. If the aim is to obtain particularly thin films, the film may also be partially removed again from the substrate by centrifugal force. The person skilled in the art is able, within the context of the present description, without any undue experimentation, to optimize the withdrawal conditions for the particular sol used so that the coating thickness desired in each case is obtained reproducibly.

It is furthermore also possible to spray the sol onto the substrate, for example via fine nozzles. If the substrate has level surfaces, printing techniques may preferably be used to apply the sol. Thus, a commercially available screen-printing medium can be added to the sol, and the mixture printed onto the substrate using a screen-printing fabric or knife-coated onto the substrate with a defined coating thickness or applied indirectly via a ceramic decal.

After each coating operation, the substrate is dried at temperatures between 50° and 250° C. and in particular between 100° and 200° C., and ignited if desired. Advantageous coatings are generally obtained if the substrate is dried and ignited after each coating operation. The minimum ignition temperature is 700° C., but preferably at least 800° C. and in particular 900° C. or more, the coated substrate frequently being kept at the maximum ignition temperature only briefly, for example for between only a few seconds and about 10 minutes. The above-described heating program has proved particularly advantageous, in which the substrate temperature is raised to the maximum heating temperature at a low heating rate, and likewise preferably cooled again at a rate comparable to the heating rate.

The systems according to the invention are distinguished by high aesthetic attraction, based on the high specular gloss, possibly in combination with a body color and/or an interference color which depends on the angle of view. In addition, the systems according to the invention are characterized by a very smooth and scratch-resistant surface and high chemical resistance. The systems according to the invention are superior to the systems described in the literature due to this combination of excellent and extremely attractive optical properties with high stability.

The coated systems are chemically very stable as shown by the examples where the stability of the coated system against acids and lyes was tested. They are furthermore very stable from a mechanical point of view. The hardness of coated systems against scratching was determined via the method by Mohs which was quite generally found to be not smaller than about 6 and especially not smaller than about 6.5. The coated systems are also thermally stable and can withstand temperatures of about 1100° C. or more, provided the substrate tolerates such high temperatures.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosures of all applications, patents and publications, cited above and below, and of corresponding Federal Republic of Germany Application P 41 05 235.8, filed Feb. 20, 1991, are hereby incorporated by reference.

EXAMPLES

A. Preparation of the metal oxide sol a) 1 liter of demineralized water is adjusted to pH=2 at a temperature of 5° C. by adding 10% Hcl. 250 ml of an aqueous $TiCl_4$ solution (400 g of $TiCl_4$/l) are subsequently added with vigorous stirring at a temperature of 3°–7° C. and at a metering rate of about 2 ml/min. The pH is kept at 2.0–2.3 by simultaneous metering in of an ion exchanger (ion exchanger II, commercial product from E. Merck, Darmstadt, Cat. No. 4766, hydroxyl form). The ion exchanger is then separated off by filtering the mixture through a nylon filter (mesh width about 80 μm). If desired, the filtrate can subsequently be further subjected to ultrafiltration, giving a 3–3.5% titanium dioxide sol having a mean particle size of less than 50 nm. The sols of chromium oxide, tin oxide, antimony oxide, zinc oxide, cobalt oxide, iron oxide, aluminum oxide and further metal oxides are prepared analogously.

b) 295 ml of $TiCl_4$ solution (400 g of $TICl_4$/l) are dissolved in 705 ml of demineralized water, and 1.4 l of an ion exchanger (ion exchanger II, commercial product from E. Merck, Darmstadt, Cat. No. 4766, hydroxyl form) is metered in over the course of 3 hours with vigorous stirring. Addition of the ion exchanger causes the pH to increase from 0 at the beginning to about 2. The further work-up is as in A.a), giving an approximately 5% titanium dioxide sol having a mean particle size of less than 50 nm. Sols of chromium oxide, tin oxide, antimony oxide, zinc oxide, cobalt oxide, iron oxide, aluminum oxide and further metal oxides are prepared analogously.

B. Production of Systems According to the Invention

Example 1

2.0 g of a 4% titanium dioxide sol are stirred with 10 g of a screen-printing medium (Degussa screen-printing medium 80683). This mixture is used to print a commercially available white glazed tile using a 61T screen-printing fabric, and the tile is subsequently dried at 100°–150° C. The coated tile is then heated to 1000° C. at a heating rate of about 16 K/min. The tile is then kept at this temperature for a few seconds and cooled at a rate of about 14 K/min. The coated tile has a colorless, glossy coating having a coating thickness of about 40 nm which is resistant to acids and lyes, such as, for example, 3% HCl, concentrated HCl, 10% citric acid or NaOH.

Example 2

2.0 g of a 4% titanium dioxide sol are stirred with 10 g of a screen-printing medium (Degussa screen-printing medium 80683), and the mixture is applied to a commercially available white glazed tile using a 100 μm doctor blade. The coated tile is dried at 100°–150° C. and then heated to 1000° C. at a heating rate of about 16 K/min. The tile is kept at this temperature for a few seconds and then cooled at a rate of about 14 K/min. The coated tile has a colorless, iridescent and glossy coating having a coating thickness of about 120 nm which is resistant to acids and lyes, such as, for example, 3% HCl, concentrated HCl, 10% citric acid or 10% NaOH.

Example 3

A tile produced as in Example I is printed with a mixture of 2.0 g of 4% aluminum oxide and 10 g of screen-printing medium (Degussa screen-printing medium 80683) (61T screen-printing fabric). This coating is dried at 100°–150° C. and ignited in accordance with the temperature program indicated in Example 1. A titanium dioxide coating is subsequently applied to this coating in accordance with the process indicated in Example 1, dried and ignited.

The coated tile has a high-gloss coating which shimmers silver-gold to lilac-blue depending on the angle of view with a thickness of about 140 nm and which is resistant to acids and lyes, such as, for example, 3% HCl, concentrated HCl, 10% citric acid or 10% NaOH.

Example 4

2.0 g of a 3.5% $Fe_2O_3$ sol are stirred with 10 g of a screen-printing medium (Degussa screen-printing medium 80683). This mixture is used to print a commercially available white glazed tile (screen-printing fabric 61T), and the tile is subsequently dried at 100°–150° C. The coated tile is then heated to 1000° C. at a heating rate of about 16 K/min. The tile is then kept at this temperature for a few seconds and cooled at a rate of about 14 K/min.

The coated tile has an ochre, high-gloss coating having a coating thickness of about 35 nm. If the coated tile is printed again with the above mixture of 2.0 g of a 3.5% $Fe_2O_3$ sol and 10 g of the screen-printing medium (Degussa screen-printing medium 80683) (screen-printing fabric 61T) and subsequently dried and ignited, an orange-red/brown, high-gloss coating having a coating thickness of about 70 nm is obtained.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of a coated system having a chemically and mechanically very stable surface coating of high aesthetic attraction and a specular and optionally iridescent color and/or body color on a metal, ceramic or quartz glass substrate having an enamel or glaze coating comprising the steps of:

a) applying at least one aqueous metal oxide sol to an enamel or glaze coating on a metal, ceramic or quartz substrate;

b) subsequently drying and optionally igniting the metal oxide coating at each application step; provided that the ignition is carried out at least once after the completion of the final application step at a temperature higher than 700° C. and below the softening point of the substrate; wherein the metal oxide sol(s) have a mean particle size of between 5 and 200 nm; the metal oxide coating on the glaze or enamel coating after ignition has a refractive index of at least 0.5 higher than the refractive index of the enamel or glaze coating; and the total coating thickness of the ignited metal oxide coating is less than 500 nm.

2. A process according to claim 1, comprising applying to the inner metal oxide coating adjacent to the substrate at least two further metal oxide coatings, the first of the two coating shaving a refractive index which is at least 0.5 lower than the refractive index of the inner metal oxide coating, and the second coating having a refractive index which is at least 0.5 higher than the refractive index of the first coating.

3. A process according to claim 1, wherein the metal oxide coating adjacent to the substrate comprises titanium oxide, iron oxide and/or chromium dioxide.

4. A process according to claim 1, wherein the metal oxide sols are selected from sols of titanium oxide, chromium oxide, tin oxide, antimony oxide, zinc oxide, cobalt oxide, iron oxide, aluminum oxide, zirconium oxide and mixtures thereof.

5. A process according to claim 1, wherein the difference between the refractive indices of the enamel or glaze coating and the adjacent metal oxide coating is at least 0.9.

6. A process according to claim 1, further comprising the addition of metal oxide salt to the surface coating of metal oxide.

7. A process according to claim 1, wherein the total coating thickness of the ignited metal oxide is between 20 and 200 nm.

8. A process for the production of a coated system according to claim 1, comprising applying one or more metal oxide coatings of defined coating thickness to the substrate having an enamel or glaze coating, wherein the substrate, after the application of the coating, is dried at temperatures between 50° and 250° C.

9. A process according to claim 1, further comprising igniting the metal oxide coating after drying the substrate.

10. A process according to claim 1, wherein the coated substrate is heated up to the maximum ignition temperature of at least 700° C. at a heating rate of between 5 and 30 K/min, and the maximum ignition temperature is carried out for a few seconds up to about 10 minutes.

11. A process according to claim 1, wherein the ignition temperature after application of the final coating is above 800° C.

12. A process according to claim 1, wherein the ignition temperature after application of the final coating is above 900° C.

13. A process according to claim 1, wherein the total coating thickness of the ignited metal oxide is between 20 and 400 nm.

* * * * *